March 8, 1932.    R. CRAIG    1,848,769
MACHINE FOR INDICATING WEIGHT AND FUNCTIONS OF WEIGHT
Filed June 4, 1920    7 Sheets-Sheet 1

Inventor
Robert Craig
By his Attorneys
Kerr, Page, Cooper & Hayward

March 8, 1932.  R. CRAIG  1,848,769
MACHINE FOR INDICATING WEIGHT AND FUNCTIONS OF WEIGHT
Filed June 4, 1920  7 Sheets-Sheet 3

March 8, 1932.   R. CRAIG   1,848,769
MACHINE FOR INDICATING WEIGHT AND FUNCTIONS OF WEIGHT
Filed June 4, 1920   7 Sheets-Sheet 4

Inventor
Robert Craig
By his Attorneys
Kerr, Page, Cooper & Hayward

March 8, 1932.   R. CRAIG   1,848,769
MACHINE FOR INDICATING WEIGHT AND FUNCTIONS OF WEIGHT
Filed June 4, 1920   7 Sheets-Sheet 6

| WEIGHT | VALUE |
|---|---|
| 50 | 150 |
|  | 148 |
|  | 146 |
|  | 144 |
|  | 142 |
|  | 140 |

Inventor
Robert Craig
By his Attorneys
Kerr, Page, Cooper & Hayward

March 8, 1932.                    R. CRAIG                    1,848,769
           MACHINE FOR INDICATING WEIGHT AND FUNCTIONS OF WEIGHT
                   Filed June 4, 1920        7 Sheets-Sheet 7

Inventor
Robert Craig
By his Attorneys
Kerr, Page, Cooper & Hayward

Patented Mar. 8, 1932

1,848,769

UNITED STATES PATENT OFFICE

ROBERT CRAIG, OF DAYTON, OHIO, ASSIGNOR TO INTERNATIONAL BUSINESS MACHINES CORPORATION, A CORPORATION OF NEW YORK

MACHINE FOR INDICATING WEIGHT AND FUNCTIONS OF WEIGHT

Application filed June 4, 1920. Serial No. 386,453.

This invention relates to scales adapted to indicate weight of a commodity, or total price thereof, or both. More specifically the invention relates to automatic weighing or automatic price-computing scales.

Without attempting to enumerate all of the objects of the invention, before specifically describing certain physical embodiments thereof, it may be stated that some of the important objects are as follows:

One of the objects is to provide an automatic weighing scale in which the more or less cumbersome and error-introducing mechanism connecting the indicator and scale mechanism, of the scales now in use, is replaced by a beam of light.

Another object is to provide a weighing scale in which the reading of weight or total price or other function of weight is projected upon a screen.

A further object is to provide a weighing scale having a plurality of ranges of readings and provided with means for automatically indicating which range should be employed. Further objects and advantages will appear as the invention is hereinafter disclosed.

Referring to the drawings which illustrate what I now consider preferred forms of my invention.

In Figs. 1 to 10 I have illustrated my invention applied to an automatic weighing scale of the pendulum type. The scale shown comprises a platform or load support 1 mounted on a base 2 and adapted to exert a downward pull on the rod or steelyard 3 in proportion to the weight of a commodity placed on the said load support 1. The connections between the platform 1 and rod 3 may be of the usual construction common in this type of scale, the nose iron portion of one of the levers forming a part of the base lever system being indicated at 4 in Fig. 2. The rod 3 is pivotally connected at 6 to the intermediate lever 5 by means of a loop 7, said lever 5 being fulcrumed at 8 on a standard 9 within the housing 10. A hook 13 is pivotally connected with the intermediate lever 5 by means of a loop 12 and knife edges 11, said hook being also secured to a cross-bar 14. A similar cross-bar 15 is connected to the first mentioned cross-bar by means of rods 16. The bar 15 has connected thereto a rod 17 pivotally connected at its upper end to the main beam 18. The last mentioned pivotal connection comprises a plate 19 secured to said rod 17 and pivotally connected to a loop 20. The latter is pivotally connected to the beam 18 by means of knife edges 21 secured to said beam. The beam 18 is fulcrumed by means of knife edges 22 secured thereto and resting in a yoke or loop 23 carried by a bracket 24 in turn secured to an upright 25 extending upwardly from the housing 10.

Figure 3:
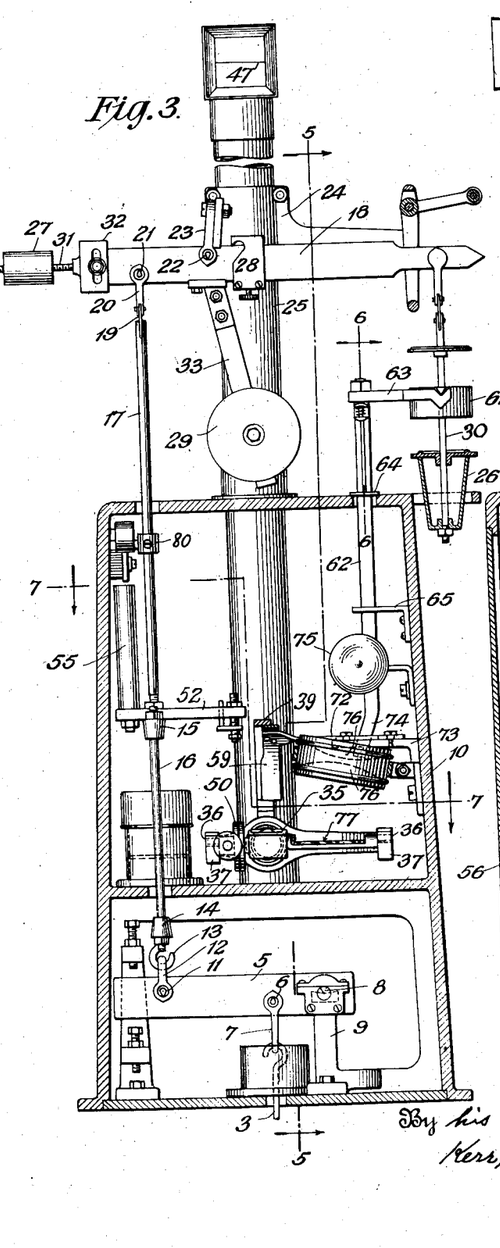
Figs. 3 and 4 are respectively front and side sectional elevations illustrating a portion of the structure of the scale shown in Figs. 1 and 2.

The beam 18 has also connected thereto a shot cup 26, pendulum or weight 29 and adjustable weight 27. The shot cup 26 is shown mounted on a rod 30 pivotally secured to the beam 18 in the same manner that the rod 17 is connected to said beam. The weight 27 is laterally and vertically adjustable with respect to the beam 18 by virtue of its screw-threaded engagement with the rod 31 carried by the vertically adjustable block 32. The function of the members 26 and 27 will be apparent to those skilled in the art. It will be seen that the weight 29 is rigidly secured to the beam 18 by means of a bracket 33 secured to both of said members.

By virtue of the above described structure, when a commodity is placed on the load support 1 the beam 18 will be deflected in a counter-clockwise direction until the torque due to the weight 29 and associated parts balances the opposing torque due to the load imposed by the commodity. It will be apparent that the deflection or vertical movement of the rod 17 will be a function of the weight of the commodity placed upon the load support. This rod may therefore be connected to means for indicating accurately and automatically the weight of the commodity. One form of such means is illustrated in Figs. 1 to 10 and may be constructed substantially as follows.

An optical device shown as a mirror 35 is mounted of oscillation by means of knife edges 36 which seat on a stationary bracket 37, the design being such that the axis of oscillation lies in the plane of the reflecting surface of said mirror. The support 25, above mentioned, is constructed in the form of a tube having at its lower end a tubular portion 38 extending at right angles to the main portion of the tube 25. The bracket 37 is shown secured to said tube portion 38. The tube portion 38 has also secured thereto by means of screws or other suitable means an arc-shaped member 39 which is preferably of such form that its center of curvature lies on the axis of oscillation of the mirror 35. The said member 39 is provided on its lower surface with a weight indicating scale as shown in Fig. 8 and will be hereinafter referred to as a chart or chart member. An image of a portion of the chart is received by the mirror 35 which is preferably silvered on its upper surface, i. e., the surface which lies toward the said chart, and reflected along the optical axis of a system of lenses 40 mounted within the tube portion 38. After passing through the lenses 40 the image of the chart is reflected by a stationary reflector 41 vertically upward to a stationary mirror 42 mounted within and adjacent the upper end of the tube 25. While the image might be projected from the mirror 42 upon an opaque screen I prefer to project it upon a ground glass or other suitable screen or finder 43 mounted within the right-angularly extending cap portion 44. For clearness I have traced the path of a ray of light from the chart 39 to the screen 43, by dotted lines in Fig. 4. Obviously, by virtue of the structure above described, an image of a portion of the chart 39 will be projected upon the screen 43 and, on movement of the mirror 35 about its axis of oscillation, the image of the chart will move vertically across the said screen. In other words when the mirror 35 is oscillated an apparent movement of the stationary chart 39 will be observed at 43. Designating as 45 the line along which an incident ray from the chart 39 must pass to be reflected by the mirror 35 along the optical axis 46, it will be apparent that the angular deflection of said line on deflection of the mirror 35 will be equal to twice the angular deflection of the said mirror. In other words, the reading of the chart image with respect to the reference line 47 on the screen 43 may be and is designed to be a function of the instantaneous angular position of the mirror 35. Before describing the means whereby the mirror 35 is moved in accordance with the weight of the commodity on the load support I wish to call attention to the fact that the lens system 40 causes an enlarged image of the chart 39 to be projected upon the reading screen 43. Furthermore as the image is reversed from right to left with respect to the chart 39 I construct the chart as shown in Fig. 8. In this figure it will be seen that the chart 39 reads from right to left instead of from left to right. For facilitating explanation I have shown, in Fig. 9, a view of the said chart 39 reversed in a right to left direction.

As previously pointed out the vertical or longitudinal movement or deflection of the rod 17 is a function of the weight of any commodity on the load support 1. I accordingly provide connections between this rod and the mirror 35 so that the angular deflection of said mirror will be a function of the weight of the commodity. A cam 50 is secured to the mirror 35 and has secured thereto one end of a flexible wire 51, the other end of which is adjustably secured to the outer end of a forked bracket or arm 52. The forked end of said arm straddles the rod 17, being secured thereto between the cross-bar 15 and a nut 53 screw-threadedly engaged at 54 with said rod 17. The arm 52 may be provided with an adjustable counterbalancing and vibration-minimizing weight 55. The shaft of the mirror 35 and cam 50 has secured thereto a weighted arm 56 which serves to bias the mirror 35 in a counterclockwise direction as viewed in Fig. 4.

While the chart 39 may comprise but a single element I may provide, for a purpose which will hereinafter appear, an additional chart member 59 movable transversely of the member 39 and adapted to assume either the full line or the dotted line position indicated in Fig. 8. When in the dotted line position the member 59, which is opaque and lies between members 39 and 35, covers or conceals a portion of the indicia units so that the chart 39 will read 0 to 1000. Assuming that said member 59 is in its dotted line position the operation of my invention, as thus far described, may be summarized as follows:

The parts are so adjusted that with no load on the platform 1 and with the chart 39 properly illuminated the reading at the reference line 47 will be zero. A commodity placed upon the load support will cause a downward movement of the rod 17 and arm 52 to an extent which is a function of the weight of the commodity. The weight 56 will cause an angular deflection of the mirror 35 to an extent which is a function of said weight of the commodity so that the image at the screen 43 will be deflected from its zero position to an extent which is a function of the last mentioned weight. The design and calibration are such that the reading at 43 on the line 47 will be the weight of the commodity on the load support.

From a theoretical standpoint the deflection of the rod 17 will not be exactly proportional to the weight of the commodity. The reason for this is that the torque exerted upon the beam 18, by virtue of the pendulosity of the same and its connected parts, varies in accordance with a trigonometric function of the angle of deflection of said beam and not directly with said angle. The parts may be so designed, however, that the deflection of the rod 17 may be made so nearly directly proportional to the weight of the commodity as to be considered exactly proportional thereto from a practical standpoint, and the chart calibration may be made uniform. If desired a higher degree of accuracy may be obtained in various ways, two of which will be mentioned here. The chart 39 may be so calibrated as to compensate for the theoretical difference between the actual deflection of rod 17 and what the deflection of the latter would be were it absolutely directly proportional to the weight of the commodity. This would mean that the chart scale would be substantially uniform but not exactly so. A preferred way, however, is so to design the cam 50 that the effective radius thereof varies so as to cause the deflection of the mirror 35 to be exactly and directly proportional to the weight of any commodity placed on the load support. With this construction the scale of the chart 39 may be made exactly uniform.

It will be noted that the biasing torque due to the weight 56 and consequently the downward pull on the wire 51 varies slightly on angular deflection of the mirror 35. Bearing in mind that the pull on the wire is but slight this variation may be considered negligible from a practical standpoint. This is especially true where the chart is so calibrated as to take care of any variation from a direct function law of the deflection of the rod 17, or where the cam 50 is so designed as to cause the deflection of the mirror 35 to be exactly directly proportional to the weight of the commodity. If desirable the downward pull on the wire 51 may be made absolutely constant by adopting the arrangement shown in Fig. 11.

Figure 1:
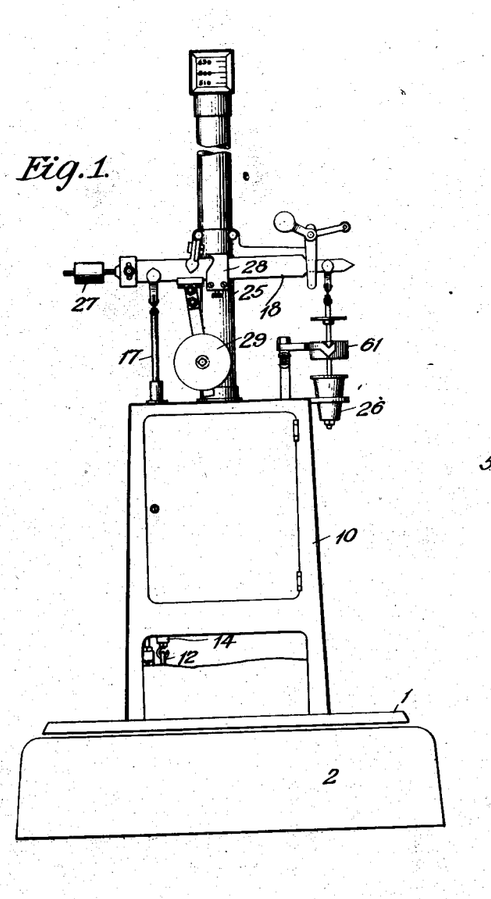
Figure 1 is a front elevation, partly broken away, of an automatic weighing scale of the pendulum type embodying certain features of my invention.
Figures 2, 11:
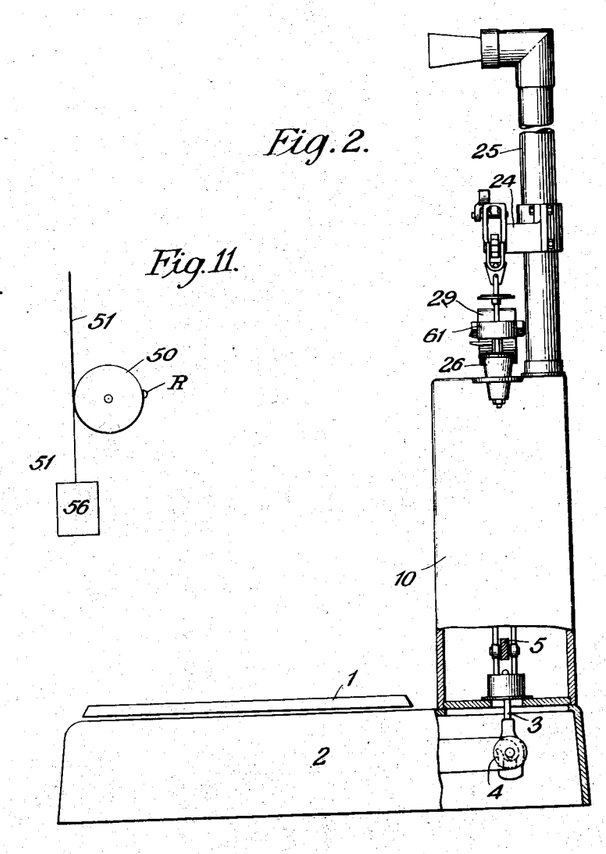
Fig. 2 is a side elevation thereof.
Fig. 11 is a detail view illustrating a slight modification in the biasing means of the weight-actuated reflector shown in the preceding figures.

Referring to the last mentioned figure, the parts 51, 56 and 50 will at once be recognized. The construction differs from that previously described in that the wire 51 passes completely around the cam 50, and is secured thereto at R. Instead of securing the weight 56 to an arm on the cam shaft, the said weight is secured to the lower end of the wire 51. Obviously, no matter what the shape of the cam may be, the downward pull on the wire 51 is constant.

I have described above a weighing scale having a range of reading or a capacity of 1-1000. In other words if any commodity weighing between 0 and 1000 is placed upon the scale load support its weight will be automatically indicated at reference line 47 on the screen or finder 43. As pointed out above, for this range of reading the member 59 is in the dotted line position indicated in Fig. 8. The capacity of the scale may be doubled by providing the doubling weight 61 which normally occupies the position shown in Fig. 3, i. e., surrounding the rod 30 but not in contact therewith. By lowering the said weight 61 until it is wholly supported by the shot cup 26 the weighing range of the scale will be 1000–2000 instead of 0–1000. In other words if a commodity whose weight is 1000 is placed on the load support, with the doubling weight in its upper position, the reading at 47 will be 1000. If the doubling weight is now lowered onto cup 26, and the member 59 left in its dotted line position (see Fig. 8), the reading at 47 will be zero. By shifting the chart member 59 to its full line position under the conditions last stated the reading at 47 will be correct, i. e., 1000 instead of zero. And if any commodity weighing between 1000 and 2000 is placed on the load support and the chart member 59 is in the position last referred to the correct reading of weight will be indicated at 47 on the screen 43. While the chart member 59 may be shifted by any suitable means I prefer to actuate or shift it by the same means employed to actuate the doubling weight 61, one form of which means may be constructed as follows:

A rod 62 carries at its upper end a forked arm 63 the bifurcated portion of which extends around and normally supports the weight 61 as indicated in Fig. 3. The rod 62 is mounted for vertical sliding movement but constrained against lateral movement by suitably slotted bracket plates 64, 65, secured to the casing 10. The upper end of said rod 62 is slotted as indicated at 66 in Fig. 6 and a bell crank lever 67 is pivoted at 68 for movement in and through said slot. A grip member integrally secured to the arm 69, in turn secured to rod 66, serves among other things to limit the counterclockwise movement of the bell crank 67 as viewed in Fig. 6, said bell crank being provided with means for biasing it in the last mentioned direction. This means is shown as comprising a compression spring 70 abutting at its opposite ends one arm of the bell crank and the member 69 and surrounding a stud 71 secured to the bell crank and slidable through the said member 69. As shown in Fig. 6 the lower end of the bell crank 67 normally engages the plate 64 so as to support the doubling weight 61 in its position shown in Fig. 3. To drop the weight 61 to its position in which it is wholly supported by the cup 26 the upper end of the bell crank 67 and the member 69 are manually gripped and pressed toward each other to cause the lower arm of the bell crank to move within the slot 66. The rod 66 together with its weight 61 may then be lowered.

Directing specific attention to Fig. 3, it will be seen that the chart member 59 is secured to a plate 72 connected by pin and slot connections to a stationary bracket 73 for lateral sliding movement. By virtue of this construction the chart member may be moved from its full line position (see Fig. 8) to its dotted line position, and vice versa. The lower end of the rod 62 is provided with a cam portion 74 which extends through slots provided in the members 72 and 73, the slot in the last mentioned member being of such size as not to impede free vertical movement of said rod 62. The slot in the plate 72 through which the cam portion 74 passes is of such size as closely to fit said cam portion, only such clearance being provided as will permit relative vertical movement of the members 72 and 74.

The operation of the doubling mechanism may be briefly described as follows. Suppose that the weight 61 is in the position shown in Fig. 3 and a commodity weighing say 1200 is placed upon the load support. No reading will be visible at 47 as the line 45 (see Fig. 4) will have moved off the chart. The operator will then drop the weight 61 in the manner above explained which will cause the member 59 to move from its dotted line to its full line position as indicated in Fig. 8 and a reading of 1200 will then be obtained at 47 on the screen 43. The operation when the weight is again raised is so obvious as to need no further description.

While the chart 39, 59, may be illuminated at all times and throughout its entire length, I prefer to illuminate it only while a weighing operation is being performed and to concentrate or spot the light upon the reigon of the chart intersected by the line 45. (As previously stated I have designated the line along which an incident ray from the chart 39 must pass to be reflected by the mirror 35 along the optical axis 46, as 45.) The illumination system comprises an incandescent electric or other suitable light 75, condensing lens or lenses 76 and a mirror or reflector 77. The lamp 75 is shown fixedly secured to the housing 10 as are also the lenses 76. The mirror 77 is mounted on the shaft of the mirror 35 so as to oscillate with the latter, the reflecting surface of the said mirror 77 being in such position as to contain at all times the axis of oscillation of said mirrors. Light rays from the lamp 75 pass through the lenses 76 and are thereby caused to converge. The rays are then reflected by the mirror 77 and brought substantially to a focus on the region of the chart 39, 59, intercepted by the line 45 no matter what the position of the last mentioned line may be. The means for energizing the lamp 75 only when a weighing operation is being performed may be constructed as follows.

Figure 4:
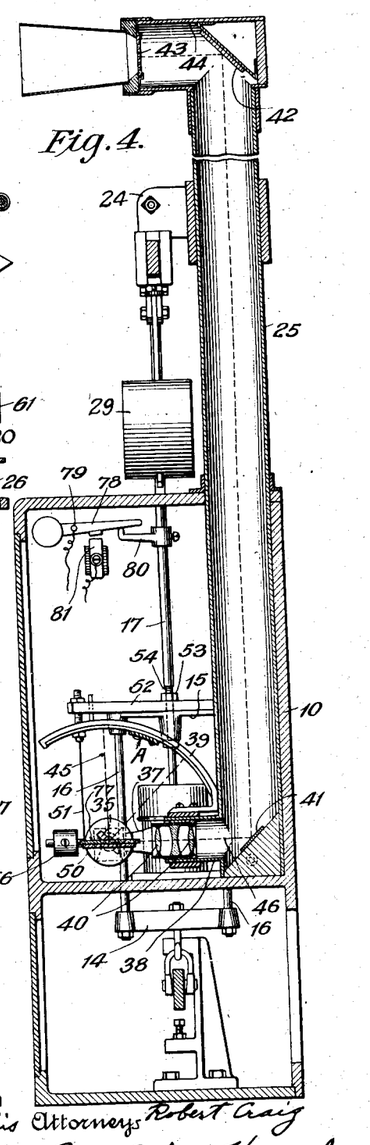
Figures 5, 6, 7, 8, 9, 10:
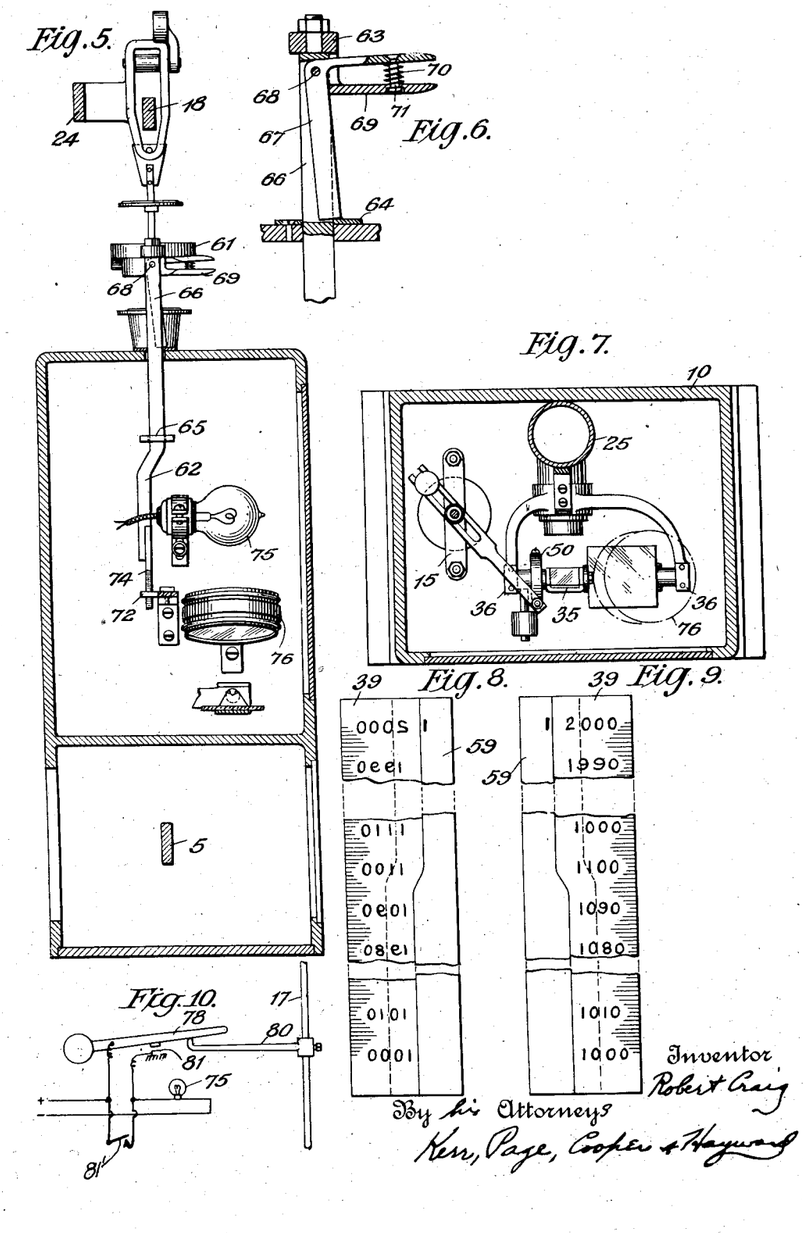
Fig. 5 is a fragmentary sectional view taken substantially on the line 5—5 of Fig. 3.
Fig. 6 is a fragmentary detail sectional view taken substantially on the line 6—6 of Fig. 3.
Fig. 7 is a sectional plan view taken substantially on the line 7—7 of Fig. 3.
Fig. 8 is a detail view of the chart looking in the direction of the arrow A in Fig. 4.
Fig. 9 is a view employed in explaining the device and representing the chart shown in Fig. 8 reversed from right to left.
Fig. 10 is a wiring diagram illustrating one form of connections for controlling the chart-illuminating means.

A switch or circuit-controlling arm 78 is pivoted at 79 on the housing 10 and is so designed as to have a slight bias in a clockwise direction as viewed in Fig. 4. When there are no goods on the load support 1 the arm 78 rests on an arm 80 secured to the rod 17 and is held thereby out of contact with the terminal or contact member 81 secured to the housing 10. When a commodity is placed upon the load support the arm 80 moves downwardly and allows the lever 78 to close on contact 81, whereupon the arm 80 is free from any pressure of the said lever 78. By connecting the lamp 75 and contacts 78—81 in series with a suitable source of E. M. F. as indicated in Fig. 10 the lamp 75 will be energized only when there is a commodity on the load support. By virtue of the structure above described a clear cut image of the chart will be obtained at 47 with a minimum consumption of energy. Furthermore the flashing of the lamp will serve to direct attention to the place where the reading is obtained.

I have described above an arrangement in which my invention is applied to an automatic weighing scale of the pendulum type. The invention may be applied to other types of scales at will. For example I have shown (in Figs. 12 and 13) the invention applied to an automatic scale of the spring type. To avoid surplusage in description it may be stated that any element in Figs. 12 and 13 which is designated by a reference numeral greater than 100 corresponds to the element in Figs. 1 to 11 which is designated by the last two digits of that reference numeral. For example, elements 101, 152 and 175 in Figs. 12 and 13 correspond to elements 1, 52 and 75 in Figs. 1 to 10. Moreover certain of the elements such as the screen 43, switch 78, etc., are omitted in Figs. 12 and 13 to avoid surplusage in description. Those portions of the scale illustrated in Figs. 12 end 13 which differ from the specific mechanism illustrated in Figs. 1 to 11 may be described as follows.

Figures 12, 14:
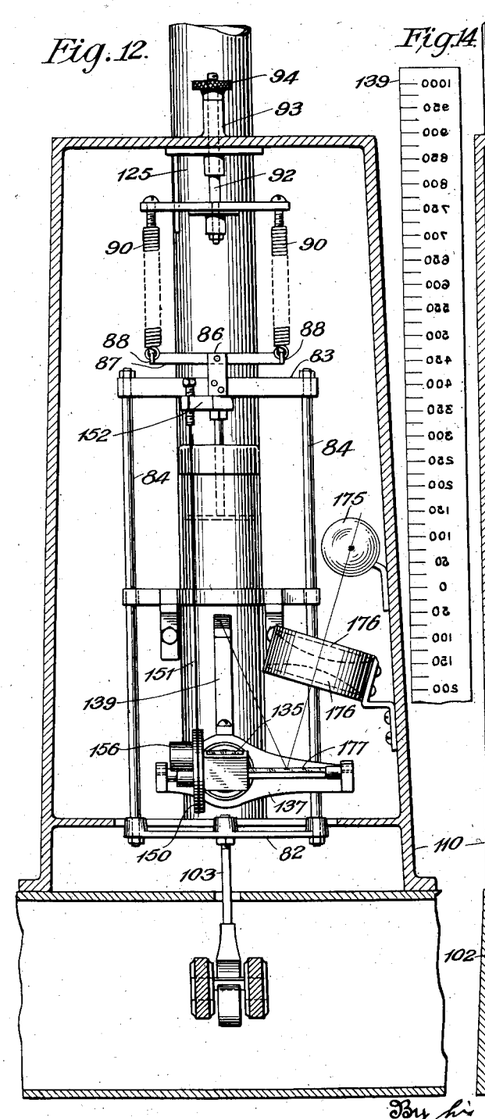
Figs. 12 and 13 are views similar to Figs. 3 and 4, but illustrating certain features of my invention applied to an automatic weighing scale of the spring type.
Fig. 14 is a view of the chart which may be employed in connection with the scale shown in Figs. 12 and 13.
Figure 13:
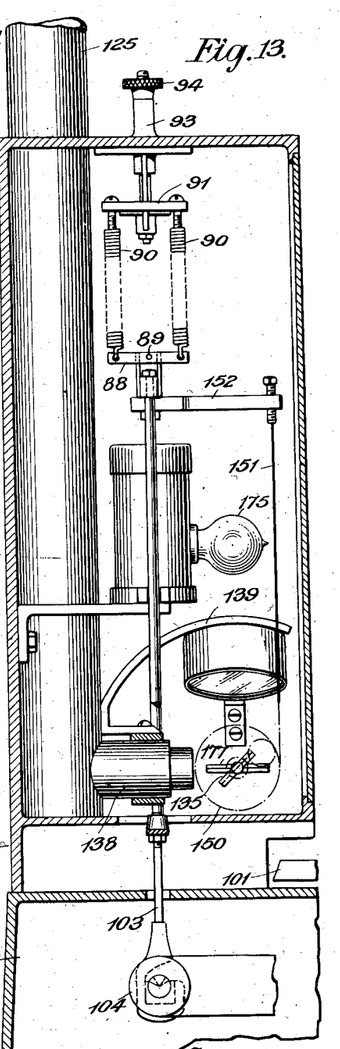

The rod 103 is connected to a cross-bar 82 in turn connected to a cross-bar 83 by means of rods 84. The upper bar 83 has pivotally connected thereto at 86 an equalizing bar or lever 87. A pair of equalizing levers 88 are each pivotally connected to a corresponding one of the ends of the lever 87. A plurality of tension springs 90, shown four in number, are each secured at one end to a plate 91 and at the other end to corresponding ends of levers 88. The plate 91 has secured thereto a rod 92 adjustable through a sleeve 93, secured to housing 110, by virtue of a nut 94 which screw-threadedly engages the upper end of said rod 92. When a commodity is placed upon the load support 101 the bar 83 will be deflected vertically downward against the action of springs 90 to an extent directly proportional to the weight of the commodity. The remaining elements of the system will be recognized in view of the description of the scale shown in Figs. 1 to 11.

The operation of the scale shown in Figs. 12 and 13 will be apparent to those skilled in the art in view of the preceding description. When a commodity is placed upon the load support 101 its weight may be read at the reference line on the screen (not shown in Figs. 12 and 13 but see the preceding figures). By turning the nut 94 the zero position of the scale may be adjusted or if desired a tare adjustment may be effected.

If the capacity of the scale shown in Figs. 12 and 13 is 1000 the chart 139 may be calibrated to read 0–1000 as in the case of the chart 39 (see Figs. 8 and 9) when the chart member 59 is in its dotted line position. Or, if desirable, the chart may be calibrated as indicated in Fig. 14 so as to indicate tare. Referring to the last mentioned figure, it will be seen that the chart 139 is calibrated to read 0–1000 on one side of the zero indication and 0–200 on the other side thereof. The operation and advantages of this form of invention will be understood from the following description.

Suppose that it is desired to weigh a large mass of fungible goods such as grain. Any suitable container may be selected to hold that portion of the grain which is being weighed. The empty container is placed upon the load support 101 and the nut 94 adjusted until the reading at the reference line of the screen or finder is zero. Grain may then be placed in the container and the net weight thereof may be read at the reference line of the screen. This process may be repeated until all of the grain is weighed. If at any time during the weighing operation it is desired to know the tare, i. e., the weight of the container, this may be found, without disturbing the adjustment of the nut 94, simply by removing the container from the load support. The image of that portion of the below-zero portion of the chart 139 which indicates the tare will thus be read on the reference line of the screen.

Besides indicating weight, scales embodying my invention may be employed automatically to indicate value or total price of the commodity being weighed. If desired the weight indication may be omitted but I prefer to indicate both weight and price. While the price-indicating feature of my invention may be applied to either of the scales already described or to other types of scales, to avoid surplusage I have shown it applies only to a scale such as the one illustrated in Figs. 12 and 13.

Figure 15:
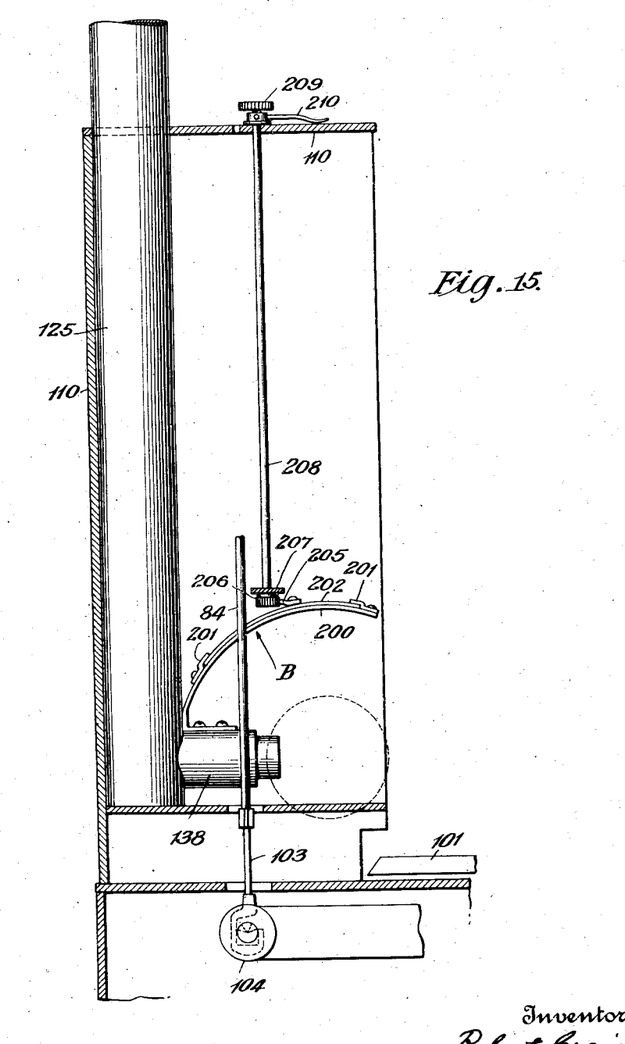
Fig. 15 is a view similar to Fig. 13 and illustrating how the scale shown in the last mentioned figure may be constructed to indicate total price of the commodity on the load support.
Figures 16, 17:
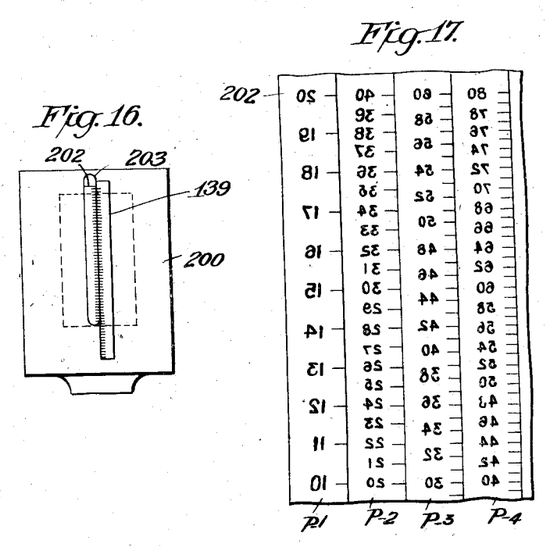
Fig. 16 is a fragmentary detail view looking in the direction of the arrow B in Fig. 15.
Fig. 17 is an enlarged detail view of a portion of the price indicating chart employed in the scale illustrated in Fig. 15.

In Fig. 15, I have indicated one form of means whereby a price indication may be obtained. It will be understood that the scale illustrated in Fig. 15 will embody all of the structure shown in and described in connection with Fig. 13. For the sake of clearness I show in Fig. 15 only a few of the various previously described elements, together with the price indicating system. The weight-chart 139 is secured, painted or inscribed upon a plate 200 (see Fig. 16) which is of the same curvature as the member 139 in Fig. 13. Slidably mounted on the back of the plate 200, by means of brackets 201, is a plate 202. The latter is provided with a plurality of rows of price indications, four of which are shown in Fig. 17, and designated P—1 to P—4. In the particular embodiment illustrated in Figs. 16 to 18 ten rows of price indications are provided but it will be understood that the number of rows may be increased and if desirable the calibration varied to compute the total price or value of a commodity valued at whole-numbers, fractions or mixed numbers per pound. The row P—1 is the one-cent-per-pound row, P—2 is the two-cent-per-pound row, P—3 the three-cent-per-pound row, and so on. The calibration and design is such that when any row is brought into the operative position and a commodity placed upon the load support, a reading of total price or value of the commodity (based on the price-per-unit weight corresponding to that particular row) will be obtained at 47 on the screen or finder. The plate 200 is preferably made thin so that the weight and price charts are at substantially the same distance from the axis of the movable mirror. In practise this plate may be made very thin and reinforced with bars or strips at its edges to provide mechanical strength and rigidity. Calling attention to Fig. 16 it will be seen that the plate 200 is provided with a slit 203 with which any one of the rows of indications P—1 to P—4 may be brought into registry with its right hand edge adjacent the left hand edge of the weight chart 129. In order to enable the operator to set the chart member 202 with respect to the chart member 200 the mechanism shown in Figs. 15 and 18 may be employed.

The plate 202 has secured thereto a rack bar 205 which meshes with a pinion 206 secured to a shaft 208. The latter is shown journaled in a stationary bearing 207 and the top of the housing 110. The upper end of said shaft 208 has secured thereto a thumb nut 209 and a pointer 210 which pointer cooperates with a dial reading one to 10 in the present instance. The design and adjustment of the parts is such that when the nut 209 is so turned as to place the pointer 210 on a particular indication on the dial 211 (Fig. 18) the plate 202 will be moved to such a position as to cause a corresponding one of the rows P—1, P—2 etc. to register with the slot 203.

Figure 18:
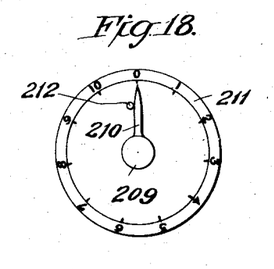
Fig. 18 is a detail plan view of the means shown in Fig. 15 for setting the price chart in accordance with the price per unit weight of the commodity under consideration.
Figure 19:
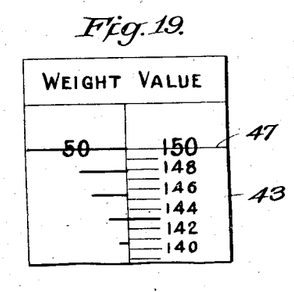
Fig. 19 is a detail view of the indicating screen or finder when a commodity weighing 50 pounds (or other units) is placed upon the load support 101 of Fig. 15.

The operation of this form of the invention may be briefly described as follows. Suppose that it is desired simultaneously to determine the weight and price of a commodity to be sold say at 3 cents a pound. The operator first turns nut 209 until the pointer indicates 3 on the dial 211. The row P—3 of indications on the price chart 202 will then register with the slit 203 in the chart member 200. The commodity may then be placed upon the load support 101 and its weight and total price will be indicated at the horizontal reference line on the screen or finder. Assuming that the weight of the particular commodity is 50 the reading at the screen will be as shown in Fig. 19, where the reading of weight at the reference line 47 is 50 and the total price reading is 150 (50×3). The operation where the commodity has some other price-per-unit-weight will be apparent to those skilled in the art and needs no further description. A stop pin 212 is mounted on the dial 211 in a position to engage the pointer 210 and prevent movement of the said pointer from 10 through 0 to 1 or vice versa.

It should be borne in mind that each of the rows of indications P—1, P—2, etc., may be made very narrow in view of the fact that the image thereof at the screen 43 is an enlarged one. Consequently a large number of said rows may be provided without exceeding dimensions defined by practise. The said rows may therefore cover a wide range of prices-per-unit-weight either in units of price, fractions thereof, or both.

Figures 20, 21, 22:
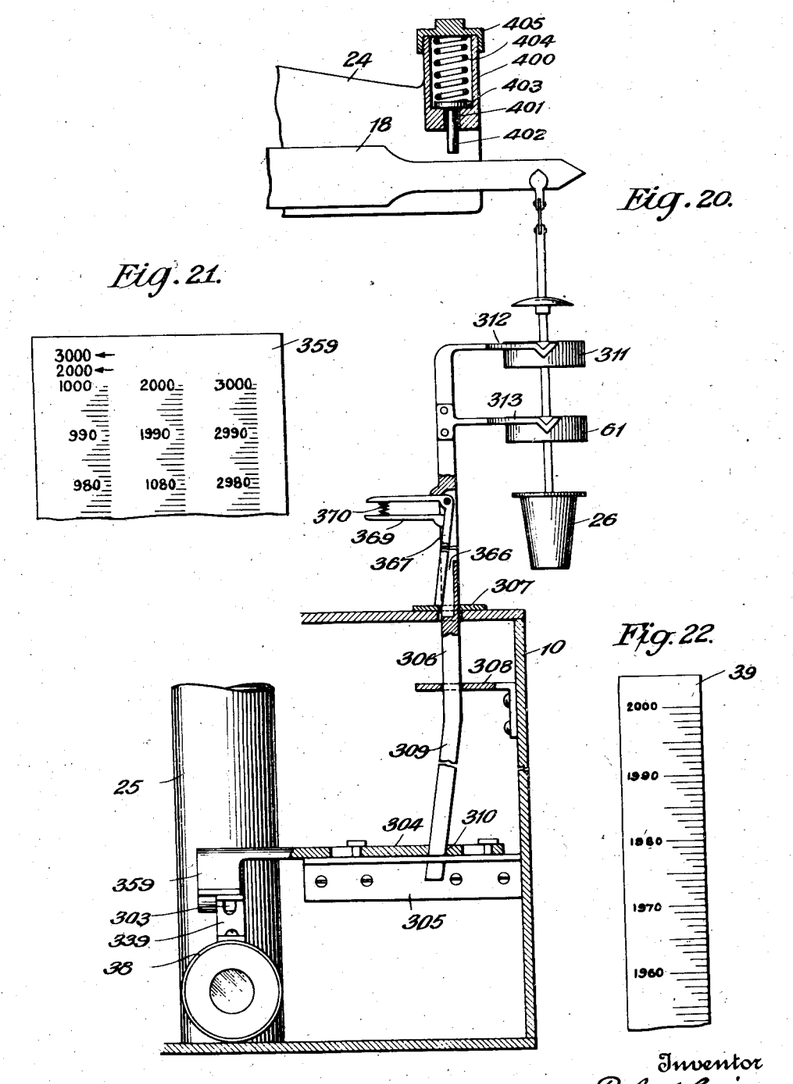
Fig. 20 is a fragmentary sectional elevation illustrating additional features of invention which may be applied to a scale of the type shown in Figs. 1 to 10.
Fig. 21 is a fragmentary detail view (reversed from right to left) of the chart shown in Fig. 20.
Fig. 22 is a detail view illustrating a modified form of weight chart, reversed from right to left.

In explaining the construction and operation of the scale illustrated in Figs. 1 to 11, I disclosed a scale in which the normal capacity or range of reading may be doubled. By the provision of suitable means the capacity may be still further increased by three, four, or more times. In Fig. 20 I have illustrated an arrangement which may be applied to the scale shown in Figs. 1 to 10 and by which the normal capacity may be doubled or trebled. In Fig. 20 I have shown only such of the parts of the scale mechanism which are embodied in Figs. 1 to 10 as are necessary for the purpose of explaining the modification.

The elements 10, 18, 26, 24, 25, 27 and 38 will at once be recognized in view of the foregoing description as will also the doubling weight 61. The chart in this form of the invention is of somewhat different form than the chart 39, 59, illustrated in Figs. 1 to 10. The chart member 339 has the same shape as the chart member 39 and may be mounted in the same way. The chart member 359 is similarly curved and is adapted to slide in a transverse direction on the side of member 339 opposite that side on which the weight-actuated mirror is located. Inspection of Fig. 21, which is reversed in a right to left direction, will show that the member 359 is provided on its under surface with a plurality of vertical rows of indications, three in the present instance. One of these rows reads 0–1000, another 1000–2000, and the other 2000–3000. For convenience we shall refer to these rows as the 1000, 2000 and 3000 rows respectively. By sliding the member 359 to the right or left with respect to the member 339, any of the 1000, 2000 or 3000 rows may be caused to register with a slit 303 in the member 339 so that an image of any portion of the selected row may be cast upon the screen or finder. The member 359 is adapted to be moved laterally by the means employed to apply the doubling and trebling weight and which may be constructed as follows.

The chart member 359 is provided with an extension 304 slidably connected with respect to a stationary bracket 305 by means of the pin and slot connections illustrated. A rod 306 is mounted for vertical sliding movement in plates 307, 308, secured to the housing 10, said rod being provided at its lower end with a laterally extending cam portion 309. The last mentioned element extends through a cam opening 310 provided in the extension 304 and also through a suitable clearance slot in the bracket 305. The rod 306 carries adjacent its upper end a pair of forked arms 312, 313 adapted to support the weights 311 and 61 respectively. In order to hold the rod in its various positions of adjustment elements 367, 369 and 370 are provided. In view of the similarity between these elements and those illustrated in Fig. 6 no further description thereof is necessary. The structure illustrated in Figs. 20 and 21 (read in conjunction with Figs. 1 to 11) is designed to operate as follows.

If the parts occupy the position illustrated in Fig. 20 the 1000 row of the chart 359 is in registry with the slit 303. If a commodity whose weight lies between the limits 0–1000 is placed upon the load support 1, its correct weight will be indicated at the reference line on the screen 43. If the commodity weighs between 1000 and 2000 the operator will apply the doubling weight 61 by moving the lower arm of the bell crank 367 into the slot 366 and allowing the rod 306 to drop until the lower end of the lever 367 will engage the upper side of the plate 308. In this position of the rod 306 the weight 61 is supported entirely by the cup 26 while the weight 311 is still wholly supported by the arm 312. Movement of the rod as last described causes the chart member 359 to move to the right to a sufficient extent to move the 1000 row away from slit 303 and to cause the 2000 row to move into registry with the slit. The correct weight of the commodity will then be indicated on the screen 43. If the commodity weighs between 2000 and 3000 the rod 306 is dropped still farther to deposit the weight 311 upon the weight 61 which is resting and wholly supported by the cup 26. Both weights 61 and 311 are then wholly supported by the cup 26. The last mentioned movement of the rod 306 also causes the 3000 row of the chart 359 to register with the slit 303 so that the correct weight of the commodity will be indicated on the screen.

It will be appreciated that the rod 306 together with its associated mechanism forms a means for changing the effective range of the scale. I have also devised means, automatically operable when any commodity is placed upon the load support, for indicating what range of reading should be employed. One form which said means may assume is shown in Figs. 20 and 21 and may be constructed as follows.

The bracket 24 carries a cup or cylinder 400 provided at one end with a bore 401 through which a plunger 402 is adapted to slide. The plunger terminates at its upper end in an enlarged head 403 against which one end of a compression spring 404 seats. The said spring is mounted in the cylinder 400 and abuts at its upper end the cap 405 screw threaded upon the cylinder. The 1000 row of the chart 359 is provided with indicia shown as 2000 and 3000 and so located as to perform the functions which hereinafter appear. The means last described are designed to operate as follows.

Assume that the parts are in the position shown in Fig. 20, with the 1000 row of the chart 359 in registry with the slit 303, and it is desired to weigh a commodity whose weight lies somewhere between the limits 0–3000. The commodity is placed upon the load support 1. If its weight lies between the limits 0–1000 the exact weight may be immediately read at the reference line on the screen. So long as the weight of the commodity is not greater than 1000 the beam 18 will not engage the plunger 402. If the weight of the commodity exceeds 1000 the beam 18 will engage the plunger 402 and compress the spring slightly to an extent proportional to the weight of the commodity. If the weight of the commodity lies between 1000–2000 the deflection of the beam will be such as to deflect the weight operated mirror 35 to such an extent as to cause the image of the 1000 mark of the 1000 row (left hand row Fig. 21) of the chart 359 to travel past the reference line on the screen 43. And in the particular case last assumed the reference line will appear to lie between the numeral 1000 and the auxiliary numeral 2000 on the 1000 row of the chart. This will indicate to the operator that the weight of the commodity is too high for the 1000 row, that the weight is between 1000–2000 and therefore the doubling weight 61 should be rendered operative in the manner previously described. The beam 18 will swing clear of the plunger 402 when the weight 61 is dropped into operative position and the correct reading of weight may be obtained at the screen.

If the weight of the commodity were between 2000–3000 instead of 1000–2000 as assumed above, the reference line would appear to be between the auxiliary numerals 2000 and 3000 on the 1000 row of the chart 359 and the operator would then know that both weights 61 and 311 should be dropped down upon the cup 26 in which event the beam 18 will again swing clear.

The weight charts 39, 139 and 359 may be graduated in any desired manner. Thus in Fig. 22 I have shown a weight chart 39 whose graduation lines are different from those illustrated in preceding figures. The type of graduation lines illustrated in Fig. 22 is at present preferred in practise.

Calling attention to Fig. 10, it will be seen that a switch 81' is shown shunted across the contacts 78—81. At certain times it is desirable to light the lamp 75 (for example to effect an adjustment) when the switch 78—81 is open. This may be done by operating the switch 81', which switch may be located at any convenient position.

The claims of the present application are each readable upon the form of invention or inventions illustrated in Figs. 1, 2, 3, 4, 5, 6, 7, 8, 9, 10, 11, 20, 21 and 22. Certain of these claims are also broad enough to read on other forms of scales as well, including the one illustrated in Figs. 12 to 19 inclusive. However, claims readable on the form of invention or inventions illustrated in Figs. 12 to 19 inclusive but not on the form of invention or inventions illustrated in the remaining Figures (1, 2, 3, 4, 5, 6, 7, 8, 9, 10, 11, 20, 21 and 22) are not asserted herein but will be found in my copending application Serial No. 594,535, filed October 14, 1922, which is a division of the present application.

In accordance with the provisions of the patent statutes, I have herein described the principle of operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted and some of the features of each modification may be embodied in the others without interfering with the more general results and effects outlined, and the invention extends to such use.

What I claim is:—

1. A weighing scale comprising in combination, a load support, a chart, means for changing the range of reading of said chart, a screen, and means comprising an optical device controlled by said load support for projecting an image of at least a portion of said chart upon said screen.

2. A weighing scale comprising in combination, a load support, automatic counterbalancing means operatively connected to said load support, a chart, means for changing the range of reading of said chart, a screen, means comprising an optical device controlled by said load support for projecting an image of at least a portion of said chart upon said screen, means for changing the force exerted by said counterbalancing means, and a common means for controlling said range-changing and force-changing means.

3. An automatic pendulum-type weighing scale comprising in combination, a load support, a chart including a stationary member and a relatively movable member, said movable member being movable from a position in which it partly conceals said stationary member to a position away from said stationary member and vice versa, a doubling weight, means for simultaneously moving said doubling weight to operative position and said movable member to one of its positions, a screen, and means controlled by said load support for projecting an image of said chart upon said screen.

4. A weighing scale comprising in combination, a load support, means for changing the capacity of said scale, means controlled by said load support for indicating what capacity-range should be employed, a chart provided with a plurality of sets of indications, and means controlled by said capacity-changing means for selectively controlling the visibility of said sets of indications.

5. An automatic scale comprising in combination, a load support, a chart having a plurality of sets of indications, manually operable means for selectively controlling the visibility of said sets of indications, and means controlled by said load support for distinctively disclosing a portion of any selected set of said indications in accordance with the weight of a commodity.

6. A weighing scale comprising in combination, a load support, means comprising a plurality of capacity weights for changing the capacity of said scale, means controlled by said load support for indicating what capacity-range should be employed, a chart provided with at least three sets of indications, and means controlled by said capacity-changing means for selectively controlling the visibility of said sets of indications.

7. An automatic scale comprising, in combination, scale mechanism, a stationary chart, means controlled by said scale mechanism for illuminating different portions of said chart in accordance with the load, a screen, and means for automatically projecting an image of the illuminated portion of said chart upon said screen.

8. An automatic scale comprising, in combination, scale mechanism, a stationary chart, means controlled by said scale mechanism for directing a beam of light upon different portions of said chart in accordance with the load, a screen, and means including a movable reflector controlled by said scale mechanism for projecting an image of at least a portion of said chart upon said screen.

9. An automatic scale comprising, in combination; a load support, a stationary chart;

means including a source of light and a condenser therefor for intensely illuminating different portions of said chart in accordance with the load upon said load support; a screen; and means for automatically projecting an image of the illuminated portion of said chart upon said screen.

10. An automatic scale comprising, in combination, scale mechanism, a stationary chart, a source of light, means including a movable reflector controlled by said scale mechanism for directing rays of light from said source upon said chart, a screen, and means including a movable reflector controlled by said scale mechanism for projecting an image of at least a portion of said chart upon said screen.

11. An automatic scale comprising, in combination, a load support, a chart, manually settable means for selectively controlling the visibility of different sections of said chart, a screen, and means controlled by said load support for distinctively disclosing upon said screen a portion of any selected section of said chart in accordance with the load upon said load support.

12. A weighing scale comprising in combination, means providing a plurality of sets of indications, a screen, and means including a manually settable device and a weight-actuated device for projecting upon said screen a portion of any one, but only one, of said sets of indications in accordance with the weight of a commodity.

13. A weighing scale comprising in combination, means providing a plurality of sets of indications, a screen, and means including a weight-actuated device for projecting upon said screen a portion of any one, but only one, of said sets of indications in accordance with the weight of a commodity.

14. An automatic scale comprising in combination, a load support, a chart having a plurality of sets of indications, manually operable means for selectively controlling the visibility of said sets of indications; and means, including an optical device controlled by said load support, for distinctively disclosing a portion of any selected set of said indications.

15. An automatic scale comprising in combination, a load support, a chart having a plurality of sets of indications, manually operable means for selectively controlling the visibility of said sets of indications; and means, including a light-reflecting device controlled by said load support, for distinctively disclosing a portion of any selected set of said indications.

16. An automatic weighing scale comprising in combination, a load support, load-offsetting means, multiplying lever connections between said load support and load-offsetting means, a chart, a screen, means including a movable optical device for projecting images of said chart upon said screen, and means controlled by said load support for governing the position of said optical device.

17. An automatic weighing scale comprising in combination, a scale lever, a chart, a screen, means including a pivotally mounted reflector for projecting said chart upon said screen, and means connecting said scale lever and reflector for causing the latter to oscillate at a different angular velocity than that of said lever.

18. An automatic weighing scale comprising in combination, a scale lever, a chart, a screen, means including a reflector mounted for oscillation about an axis spaced from the axis of oscillation of said lever for projecting said chart upon said screen, and means connecting said scale lever and reflector.

19. An automatic weighing scale comprising in combination, a scale lever, chart, a screen, means including a reflector mounted for oscillation about an axis spaced from the axis of oscilaltion of said lever for projecting said chart upon said screen, and means including a flexible element connecting said scale lever and reflector.

20. An automatic weighing scale comprising in combination, a load support, load-offsetting means therefor, a chart, a screen, means including a movable optical device for projecting said chart upon said screen, and multiplying lever connections between said load support and optical device.

21. In a weighing scale, in combination, a chart having series of graduations, and means for selectively projecting graduations from each of said series.

22. In a weighing scale, in combination, a chart having successive series of graduations, and means for selectively projecting graduations from each of said series.

23. In a weighing scale, in combination, beam weighing mechanism for offsetting a portion of the load, automatic weighing mechanism for offsetting the remainder of such load, a chart having successive series of graduations, means for selecting a series of graduations according to the portion of the load offset by said beam weighing mechanism, means for projecting an indication from said chart, and means controlled by said automatic weighing mechanism for selecting the graduations to be so projected.

24. In a weighing scale, in combination, automatic load-offsetting mechanism, a beam connected thereto, a unit weight, means for placing said unit weight upon said beam, a chart having a series of graduations representing weights to be offset by said automatic mechanism, a series of graduations representing weight to be offset by said automatic mechanism and said unit weight acting in conjunction, and means for projecting an indication from either series of graduations.

25. In a weighing scale, in combination, automatic weighing mechanism, a beam, a unit weight, means for applying said unit weight to said beam, a chart having a series of graduations corresponding to weights within the capacity of said automatic mechanism and a series of graduations corresponding to weights to be offset by said unit weight and said automatic mechanism acting together, and means for displaying a proper graduation from the first said series when the unit weight is off the beam and a proper graduation from the second said series when said unit weight is on the beam.

26. An automatic scale comprising in combination, a load support, a chart having a plurality of sets of weight-indicating numerals, a number of light-transmitting material having a reading line thereon, manually operable means for selectively controlling the visibility of said sets of numerals at said member and for applying a capacity weight to the scale, and means controlled by said load support for disclosing at said reading line a portion of any selected set of said numerals in accordance with the weight of a commodity.

27. The combination set forth in claim 26 in which the first mentioned means comprises a device located between the chart and reading line and relatively movable with respect to the chart.

28. A weighing scale comprising in combination, a load support, automatic load-offsetting mechanism, means having a series of graduations representing weights to be offset by said automatic mechanism, a capacity weight and means for applying the same to a movable part of the scale, means controlled by said capacity weight applying means for causing said series of graduations to represent weights to be offset by said automatic load-offsetting mechanism and said capacity weight acting in conjunction, a screen and means including a part controlled by said load support for projecting the weight indications upon the screen.

29. A weighing scale comprising in combination, a load support, automatic load offsetting mechanism, a screen, means including a part controlled by said load support for automatically displaying upon said screen weight-indicating images within the range of said automatic load-offsetting mechanism, a capacity-weight and means for applying the same to a movable part of the scale, and means operated upon the application of said capacity weight for displaying upon said screen weight-indicating images corresponding to loads beyond the range of said automatic load-offsetting mechanism when acting alone.

30. A weighing scale comprising in combination, a load support and load-offsetting means therefor, a stationary chart, a screen, means for reflecting images from said chart, and means controlled by said load support for receiving the reflected images and reflecting them upon the said screen.

31. In a weighing scale, in combination, a chart having rows of graduations thereon, a projector adapted to project a real image of a portion of said chart, said chart and projector being relatively movable, manually operable means for moving one of said elements, and weighing mechanism for controlling the operation of the other of said elements.

In testimony whereof I hereto affix my signature.

ROBERT CRAIG.